(12) United States Patent
Elswick et al.

(10) Patent No.: US 6,791,620 B1
(45) Date of Patent: Sep. 14, 2004

(54) MULTI-FORMAT VIDEO PROCESSING

(75) Inventors: William E. Elswick, Santa Monica, CA (US); David L. Schnuelle, Los Angeles, CA (US); Andrew H. Maltz, Sherman Oaks, CA (US); William F. McGill, Manhattan Beach, CA (US)

(73) Assignee: Avica Technology Corporation, Santa Monica, CA (US)

( * ) Notice: Subject to any disclaimer, the term of this patent is extended or adjusted under 35 U.S.C. 154(b) by 0 days.

(21) Appl. No.: 09/551,929

(22) Filed: Apr. 19, 2000

(51) Int. Cl.[7] .......................... H04N 11/20; H04N 7/01
(52) U.S. Cl. ...................... 348/441; 348/555; 348/659; 348/722
(58) Field of Search ................................. 348/554, 555, 348/556, 558, 659, 705, 706, 722, 441–459

(56) References Cited

U.S. PATENT DOCUMENTS

| | | | |
|---|---|---|---|
| 5,537,157 A | 7/1996 | Washino et al. | 348/722 |
| 5,754,248 A | 5/1998 | Faroudja | 348/474 |
| 6,151,075 A * | 11/2000 | Shin et al. | 348/459 |
| 6,157,415 A | 12/2000 | Glen | 348/599 |
| 6,177,922 B1 * | 1/2001 | Schiefer et al. | 348/441 |
| 6,285,371 B1 * | 9/2001 | Gould et al. | 345/422 |
| 6,353,460 B1 * | 3/2002 | Sokawa et al. | 348/555 |
| 6,370,198 B1 * | 4/2002 | Washino | 348/441 |

OTHER PUBLICATIONS

Internet web site for Panasonic, "AJ–HD2700, D–5 HD Multi–Formating Mastering VTR—Features" http://panasonic.com/PBDS/products/vtrs vcrs/f aj–hd2700.html 1 page, Nov. 1, 2000.

Internet web site for Panasonic, "AJ–HD2700, D–5 HD Multi–Formating Mastering VTR—Accessories" http://panasonic.com/PBDS/products/vtrs vcrs/acc/a aj–hd2700.html 1 page, Nov. 1, 2000.

Internet web site for Panasonic, "AJ–HD2700, D–5 HD Multi–Formating Mastering VTR—Specification"http://panasonic.com/PBDS/products/vtrs vers/spec/s aj–hd2700.html 2 pages, Nov. 1, 2000.

Internet web site for Sony, "Videotape Recorders: HDCAM: HDW500" http://bpgprod.sel.sony.com/model.bpg?cat=Videotape+Recorders&subcat=HDCAM&model . . . 2 pages, Nov. 1, 2000.

(List continued on next page.)

*Primary Examiner*—John Miller
*Assistant Examiner*—Trang U. Tran
(74) *Attorney, Agent, or Firm*—Mitchell Silberberg & Knupp LLP

(57) ABSTRACT

Video signals in different video formats are managed by inputting and outputting video signals via multiple channels and inputting a user selection of a video format for each channel. Then, a video signal input via a first channel is automatically converted into the video format selected for a second channel, and the video signal, in the video format selected for the second channel, is output via the second channel. Also, video signals in different video formats are managed by inputting and outputting video signals through multiple channels, with each such channel having an associated video format. A user designation is input that an output of a user-designated first channel should provide an output video signal corresponding to an input video signal input via a user-designated second channel. The input video signal is then automatically converted to the video format associated with the user-designated first channel, so as to obtain the output video signal, and the output video signal is output via the user-designated first channel.

25 Claims, 6 Drawing Sheets

OTHER PUBLICATIONS

Internet web site for Sony, "Videotape Recorders: HDCAM: HDW500—Features" http://bpgprod.sel.sony.com/modelfeatures.bpg?cat=Videotapr+Recorders&subcat=HDCAM&model . . . 2 pages, Nov. 1, 2000.

Internet web site for Sony, "Videotape Recorders: HDCAM: HDW500—Specifications"http://bpgrprod.sel.sony.com/modelspecifications.bpg?cat=Videotape+Recorders&subcat=HDCAM&model . . . 2 pages, Nov. 1, 2000.

Internet web site for Sony, "Videotape Recorders: HDCAM: HDW500—Accessories" http://bpgprod.sel.sony.com/modelaccessories,bpg?cat=Videotape+Recorders&subcat=HDCAM&model . . . 1 page, Nov. 1, 2000.

Internet web site for Sony, "Videotape Recorders: HDCAM: HDW500—Selected Product Configurations" http://bpgprod.sel.sony.com/modelconigurations.bpg?cat=Videotape+Recorders&subcat=HDCAM&model . . . 1 page, Nov. 1, 2000.

Wiswell, David, "Panasonic AJ–UFC1800 Universal Format Converter" Panasonic Technology Overview 12 pages, Apr., 2000.

Wiswell, David, "Panasonic AJ–HD3700 D–5 Multi–Format Mastering VTR" Panasonic Technology Overview 5 pages, Apr., 2000.

Wiswell, David, "Panasonic DVCPRO—From DV to HD" Panasonic Technology Overview 7 pages (no date indicated).

Morimoto, Takeshi, et al., "Ancillary Data Management in D–5 Recording Systems" Panasonic Technology Overview, 8 pages.

Panasonic Publication entitled "DVCPRO News Automation", 16 pages, Dec., 1999.

Internet web site for Visual Matrix Corporation, "Ubox HDTV Upconverter" http://www.visual–matrix.com/ubox.htm, 3 pages, Nov. 1, 2000.

Visual Matrix Corporation, price list, 1 page, Apr. 2000.

Visual Matrix Corporation, Product Information for the "RTC2 Scan Converter", 1 page, (no date indicated).

Visual Matrix Corporation, Product Information for the "Xbox Modular Video System", 1 page, (no date indicated).

Visual Matrix Corporation, Product Information for the "Ubox HDTV Upconverter", 1 page, (no dated indicate).

* cited by examiner

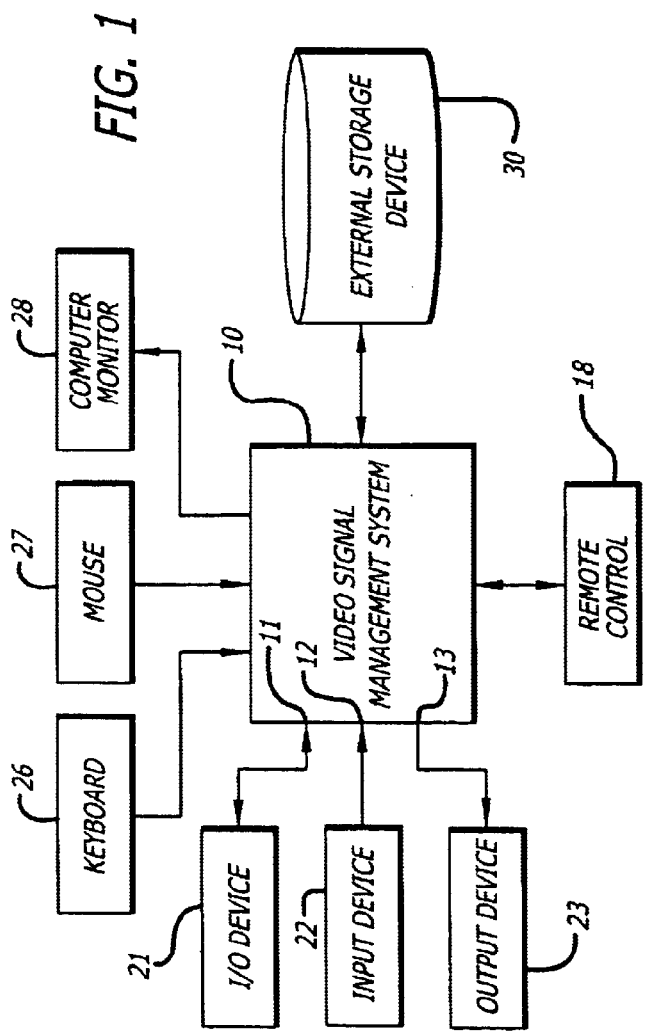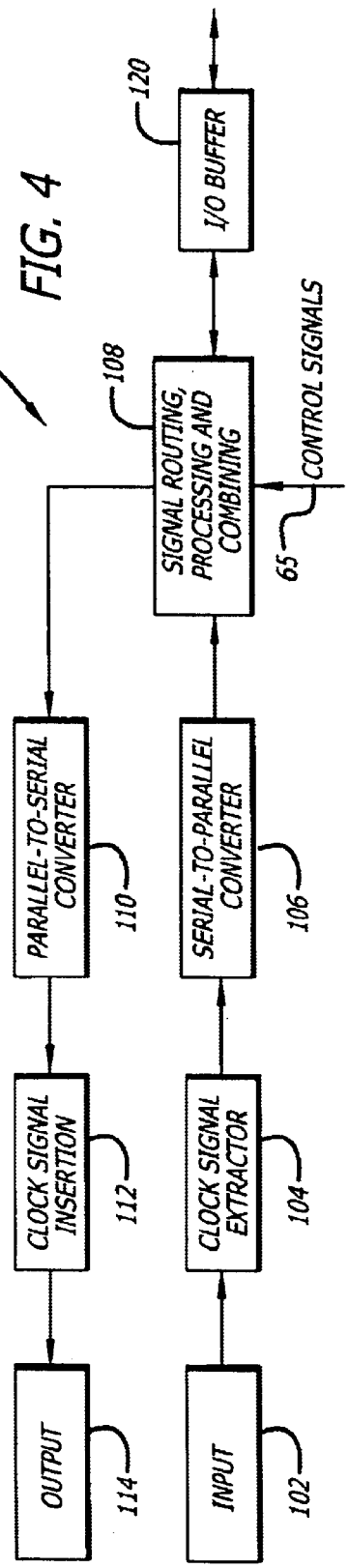

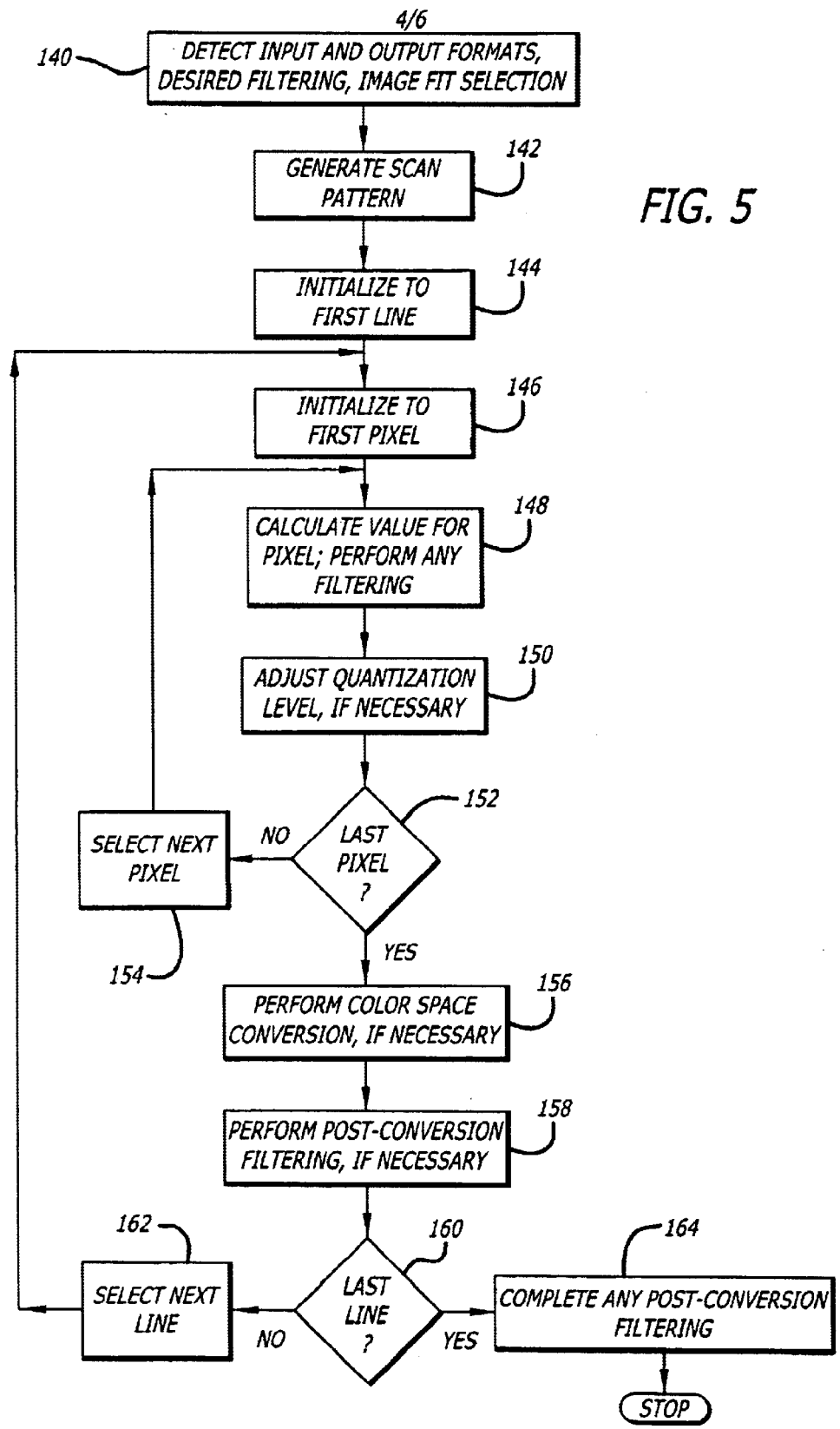

MULTI-FORMAT VIDEO PROCESSING

BACKGROUND OF THE INVENTION

1. Field of the Invention

The present invention relates to processing video signals in different video formats, and particularly relates to an apparatus that can facilitate working with such differently formatted video signals.

2. Description of the Related Art

Processing and displaying video signals has many applications in fields as varied as closed-circuit television and medical imaging, as well as in commercial broadcast, cable and satellite television. A video signal typically consists of a serial stream of data that represents moving image data. More specifically, such data typically represent consecutive still images (frames) that when viewed in sequence convey a sense of motion. In fact, if such frames are captured and then displayed to the viewer quickly enough (i.e., at an adequate frame rate), the display of such discrete frames is perceived by humans as true continuous motion video. For this to occur, the frame rate typically must be at least approximately 20 frames per second, although frame rates as low as 8 to 12 per second may be used in some cases if a sufficiently high flash rate is used. At slower flash rates, flicker may be visible and/or the motion may appear to the viewer to be discontinuous.

The serial data (in analog or video format) comprising a video signal typically is originally generated by repetitively scanning a moving image, which has been focused by a lens system, in a sequence of horizontal scanning lines from the top to the bottom of such image. In one variation (called "non-interlaced" or "sequential"), all horizontal lines are scanned in each pass from top to bottom. In another variation (called "interlaced"), for each frame only the odd lines are scanned in a first pass and then only the even lines are scanned in a second pass. In such interlaced formats, the collection of all odd lines for the frame is termed a "field" and the collection of all even lines for the frame is another field, meaning that each frame consists of two separate fields.

Thus, as used herein, the term "video signal" is intended to mean a stream of data or an analog signal representing a succession of image frames. As indicated above, a video signal may represent a moving image. Such a moving image video signal is referred to herein as a "live video signal", regardless of whether such video signal is being currently generated or retrieved from a storage medium. It is also possible for the succession of frames represented by a video signal to consist of identical frames. Typically, in such a case the same frame is being scanned repetitively. The situation in which the video signal represents such a succession of identical video frames is referred to herein as a still frame or single frame video signal. In the case of a still frame interlaced video signal, the two fields may or may not be identical.

For some time now, a number of different video signal formats have existed. For example, the standard video format in the United States (the National Television Systems Committee, or NTSC, standard) includes 525 horizontal lines per frame. Only 483 of these lines are "active", i.e., include actual image information, with the remainder including synchronization and other information. In contrast, the standard format in Europe includes 625 horizontal lines per frame, of which only 576 lines are active. Both of these standards are examples of interlaced standard definition (SD) video formats.

In recent years, the number of video formats in use has increased substantially, particularly as the result of work in the area of digital television that includes high definition (HD) format television. For example, there are currently 18 different SD arid HD formats that have been authorized by the Federal Communications Commission (FCC) for use in the digital television broadcast frequencies. Many of the HD formats are non-interlaced formats, although currently the dominant HD format is interlaced. The most common HD formats have spatial resolutions of 1920 by 1080 pixels and 1280 by 720 pixels, respectively, as compared with the NTSC format which has a spatial resolution of 720 by 483 pixels.

Over time, it is expected that many commercial broadcast markets will transition to HD standards. However, in the meantime, for a number of reasons, not the least of which is the substantial investment in equipment and consumer devices that are only capable of handling SD formats, various HD video formats are likely to co-exist with the now commonly used SD video formats for many years to come.

Moreover, beyond the context of commercial broadcasting, a number of additional video formats have been employed in various contexts. For instance, in the field of medical imaging, it is common for different specialized video formats to be used for magnetic resonance imaging (MRI) and for computer-aided tomography (CAT) imaging.

In addition to characteristics such as spatial resolution and whether the signal is interlaced or non-interlaced, the various video formats may be differentiated by any or all of: pixel aspect ratio, image aspect ratio, the color space in which the image is defined, whether subsampling has been used, and (for digital images) the number of quantization levels in which each element of a picture's color is represented. Thus, conversion from any particular format to any other particular format often is not a simple matter and typically has been accomplished using special-purpose hardware.

Nevertheless, in many situations it is desirable to work with and/or to combine video signals having different formats. For example, as HD becomes more commonplace, it is increasingly important to be able to quickly combine, or to be able to quickly transition between, a particular SD format video source and a particular HD format video source for television broadcast/transmission purposes. Similarly, for example, it may be desirable to quickly incorporate a relatively short MRI video segment into a standard NTSC transmission.

Unfortunately, the present inventors have discovered that it is often quite difficult to accomplish such tasks with conventional techniques. In particular, such conventional techniques typically require the user to disconnect an existing hardware configuration, locate the appropriate special-purpose hardware conversion unit, and then reconfigure the system, whenever a new video format is introduced or required as an output.

SUMMARY OF THE INVENTION

The present invention addresses the foregoing problem by providing apparatuses and related techniques for managing video signals in different video formats. For example, the present invention can be implemented using multiple channels in which input and output devices having different formats can be connected on different channels, with each channel having access (in its own format) to the video image data input on any other channel or to any video image data retrieved from storage, with all format conversion occurring automatically, and with the format for each channel being user-selected: As an alternative example, the present invention can be implemented using a single channel, having access (in its own format) to any video image data retrieved from storage, with all format conversion occurring automatically, and with the format for the channel being user-selected. Various other combinations of such features (as well as the other features described herein) can be provided in other implementations of the present invention.

Thus, in one aspect, the invention is directed to managing video signals in different video formats by inputting and outputting video signals through multiple channels, with each such channel having an associated video format. A user designation is input that an output of a user-designated first channel should provide an output video signal corresponding to an input video signal input via a user-designated second channel. The input video signal is then automatically converted to the video format associated with the user-designated first channel, so as to obtain the output video signal, and the output video signal is output via the user-designated first channel.

By virtue of the foregoing arrangement, the output of a channel operating in one video format can be made to track a video signal that is input into another channel operating in a different format. Moreover, the foregoing arrangement can permit a user to designate which channel tracks which. This feature of the present invention often can provide the user with a significant amount of flexibility when configuring a video system.

In a further aspect, the invention is directed to managing video signals in different video formats by inputting and outputting video signals through multiple channels. A user inputs a selection of a video format for each of the channels and also inputs a user designation that an output of a user-designated first channel should provide an output video signal corresponding to an input video signal input via a user-designated second channel. The input video signal is then automatically converted to the video format selected for the user-designated first channel, so as to obtain the output video signal, and the output video signal is output via the user-designated first channel.

Thus, the foregoing arrangement not only can permit a user to designate which channel tracks which, but also can allow the user to select a video format for each channel. This additional feature provides even more flexibility, in certain embodiments allowing the user to more or less arbitrarily select video formats and designate which channel(s) track which.

In a more particularized aspect, the invention is directed to managing video signals in different video formats by inputting and outputting video signals through multiple channels, capturing a single frame of an input video signal, and inputting a user selection of a video format for each channel and a user designation that an output of a user-designated first channel should output frames captured from a video signal input into a user-designated second channel. Frames captured from the video signal input into the user-designated second channel are then automatically converted into the video format selected for the user-designated first channel, and the captured frames are output, in the video format selected for the user-designated first channel, via the user-designated first channel.

The foregoing arrangement can provide many of the benefits of the above-described aspects of the invention with respect to frames captured from a live input video signal.

In a still further aspect, the invention is directed to managing video signals in different video formats by inputting a selection of an output video format and a selection of an item of video data to retrieve from a storage. The selected item of video data is then retrieved from storage and the video format in which the selected item of video data was stored is detected. Thereafter, the retrieved item of video data is automatically converted into an output video signal in the selected output video format, and the output video signal is transmitted to an output.

By virtue of the foregoing arrangement, items of video data stored in different formats typically can be retrieved and output to a single port in a single user-specified video format. As a result, much of the system reconfiguration to deal with differently formatted video signals required with conventional arrangements often can be avoided.

In a still further aspect, the invention is directed to managing video signals in different video formats by inputting and outputting video signals via multiple channels and inputting a user selection of a video format for each channel. Then, a video signal input via a first channel is automatically converted into the video format selected for a second channel, and the video signal, in the video format selected for the second channel, is output via the second channel.

The foregoing summary is intended merely to provide a brief description of the general nature of the invention. A more complete understanding of the invention can be obtained by referring to the claims and the following detailed description of the preferred embodiments in connection with the accompanying figures.

BRIEF DESCRIPTION OF THE DRAWINGS

FIG. 1 is a block diagram illustrating the external interconnections of a video signal management system according to the present invention.

FIG. 4 is a simplified block diagram illustrating dedicated hardware for input and output processing of video signals according to a representative embodiment of the present invention.

FIG. 5 is a flow diagram illustrating steps for video format conversion according to a representative embodiment of the invention.

DESCRIPTION OF THE PREFERRED EMBODIMENT(S)

Overview

Figure 2:
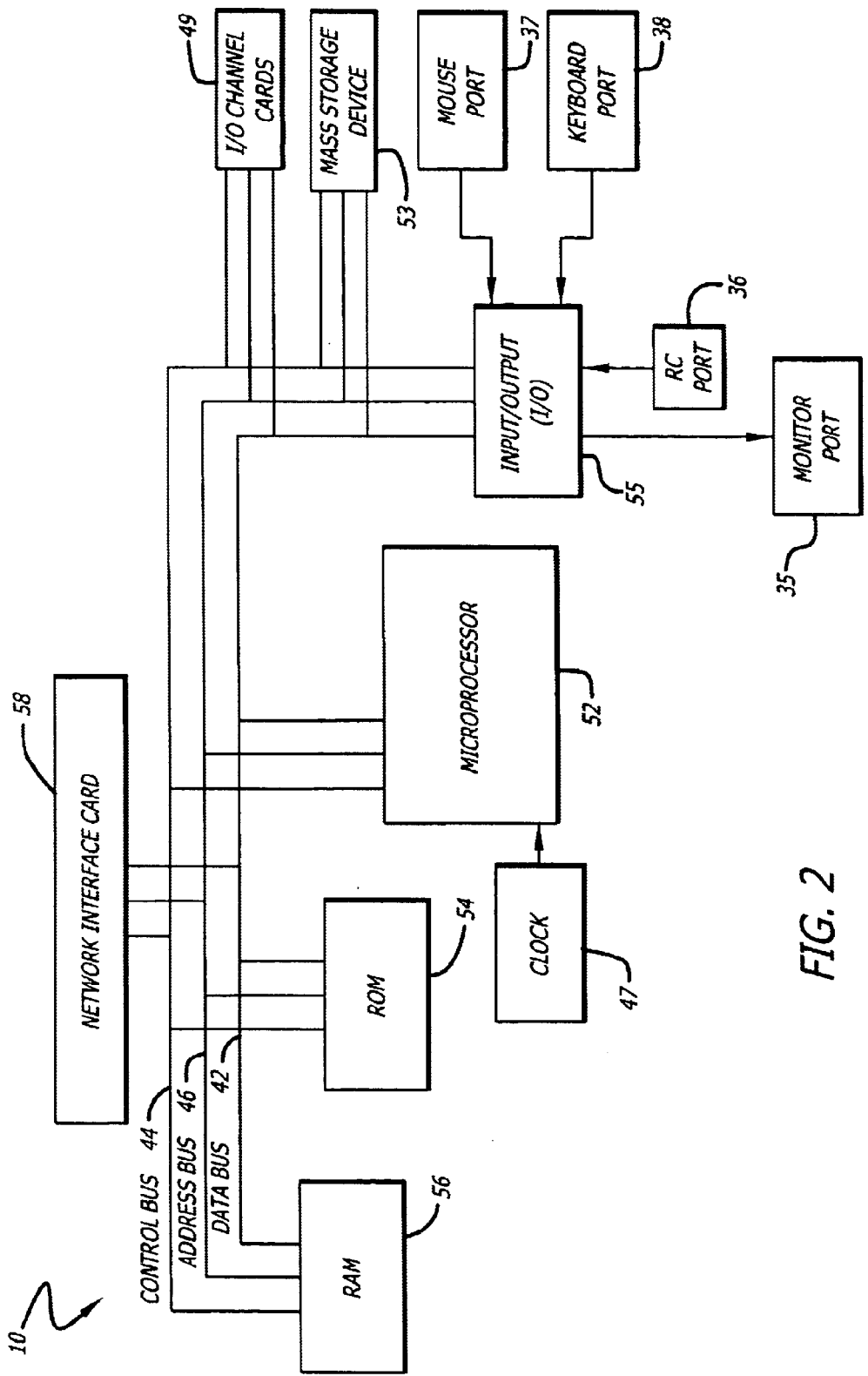
FIG. 2 is a simplified block diagram of a video signal management system hardware configuration according to a representative embodiment of the invention.

Generally speaking, the present invention concerns systems and techniques for handling video signals in different formats and for converting between those different formats in a simple and highly adaptable manner. The preferred embodiment of the present invention concerns a video still-store apparatus (i.e., one whose primary function is to capture, store and/or process single frames from a live video signal). However, as will become apparent below, the systems and techniques described below can also be applied in other video processing environments.

FIG. 1 illustrates a video signal management system 10 according to the preferred embodiment of the present invention. As noted above, system 10 preferably is implemented as a still-store device. Video signals are input into and output from system 10 via plural channels, such as channels 11 to 13. Each such channel preferably is configured to accommodate either standard definition or high definition video signals. As a result, the circuitry associated with the channels only required to accommodate SD signals can be simplified as compared with that required for the HD channels. The specific SD or HD format for each channel preferably is selected within system 10, either in response to a user designation or by system 10 detecting the type of hardware connected to such channel and identifying the signal format utilized by such device (e.g., using a look-up table). Each channel may include one or more inputs and/or one or more outputs. In the arrangement illustrated in FIG. 1, channel 11 includes at least one input and at least one output, channel 12 includes at least one input, and channel 13 includes at least one output. In addition, all input/output (I/O) signals for system 10 preferably are digital, meaning that any analog device connecting to system 10 must connect through an appropriate analog-to-digital (A/D) or digital-to-analog (D/A) converter.

Video signal management system 10 communicates with computer keyboard 26, mouse or other pointing device 27, computer display monitor 28, and remote control (RC) 18, which in turn provide user interfaces through which a user may view and control the functionality of system 10. For instance, a user might designate a specific video signal format for a particular channel using such interfaces.

Preferably, system 10 runs an interface program that includes a graphical user interface (GUI) for displaying and accessing the functionality of system 10. In the preferred embodiment of the invention, keyboard 26 is an ordinary computer keyboard for entering text and for navigating a display (e.g., using arrow keys), pointing device 27 is a computer mouse (although it may instead be a trackball, joystick or similar device), and computer monitor 28 is a video graphics array (VGA) cathode ray tube (CRT) monitor (although it may instead be a liquid crystal display (LCD) or any other type of monitor). Remote control 18 preferably is a relatively small self-contained unit that includes buttons or other physical interface controls for accessing the functionality, or at least the most commonly utilized functionality, of system 10. Optionally, system 10 may also communicate with stand-alone computers, such as any of a notebook or desktop computer, or any other general or special purpose computer. The user interfaces are described in more detail below.

In operation, a live video signal typically is input into system 10, such as via I/O device 21 or input device 22. Such input devices might include a digital video tape player, a digital video disk player, a digital video camera, or any other device that provides moving video image data. In a common operational mode, such input video signal is simply routed to an output on the same channel as the input. In this situation, I/O device 21 might include a digital video tape player and a video monitor which operate on the same video format. As a result, system 10 designates that format for channel 11. Ordinarily, the video signal provided by the tape player portion of device 21 would be input into the channel 11 input and then made available by system 10 at the output of channel 11. This output signal is then connected to the video monitor portion of device 21. While viewing this live video, the user may instruct system 10 (via the provided user interface) to "grab" a frame, in which case system 10 captures the current frame. Depending upon control parameters set in system 10 (e.g., via the provided user interface), system 10 will either continue to route the input video signal for channel 10 to channel 10's output or else will begin outputting such captured still frame at channel 10's output (i.e., continuously displaying that frame). In the latter case, channel 10's output ordinarily again will begin reflecting the live video input only upon user designation to return channel 10's output to such live video.

Once a frame has been captured in the foregoing manner, the user may designate that the frame be stored, either to a storage device internal to system 10 or to an external storage device, such as device 30 (which typically will be a commercially available file server). Having such a storage device available also gives the user additional input options. For instance, in addition to specifying the input video or a captured frame at channel 11's output, the user may also select from among any of the frames previously stored and the corresponding video signal then will be continuously provided to channel 11's output. Alternatively, the user may switch between such video sources, e.g., first providing live video, then a sequence of individual frames, and then back to live video. The transitions between such video sources also can be softened by system 10 providing (e.g., under control of the user) various transitional effects, such as wipe or dissolve. The foregoing features all can be provided using a system 10 that includes only a single channel (the format of which may or may not be user-selectable).

In addition, by providing more than one channel system 10 also allows the user to input other video signals or output to other devices via the other available channels. For example, a user may designate that a frame be grabbed and/or stored from the live video signal input at channel 12. In the preferred embodiment, any frames captured or stored from such live video signal also will then be available for the user to designate at the output of channel 11. Moreover, according to the present invention, system 10 automatically performs any necessary format conversions. Thus, if the user requests system 10 to capture a frame from the video signal at the input of channel 12 and then to display that frame at the output of channel 11, and if the video format for channel 12 is different than the video format of channel 11, system 10 automatically converts the format of the captured frame for display on channel 11. Similarly, if the user requests that a frame be retrieved from storage device 30 and displayed at the output of channel 11, and the frame was stored in a different video format than that of channel 11, system 10 automatically converts the format of the retrieved frame for display on channel 11.

Still further, using an additional output channel, an input video signal can be displayed in a variety of different video format. For instance, a user might designate that the outputs of channels 11 and 13 track frames captured on channel 12. In this case, a frame captured from the video signal at the input of channel 12 automatically would be converted into the format of channel 11 and the converted signal delivered to the output of channel 11. Similarly, the frame captured from the video signal at the input of channel 12 automatically would be converted into the format of channel 13 and the converted signal delivered to the output of channel 13. For example, a user might capture frames from a HD video signal input on channel 12 and immediately have such frames displayed on a SD (e.g., NTSC) monitor attached as device 21 to channel 11 and on a HD monitor attached as device 23 to channel 13. If such frames are also displayed at the output of channel 12, the user can compare the three representations side by side.

Because each channel of system 10 can be configured (either by the user or automatically) in a very short period of time, system 10 permits input and output devices utilizing various video formats to be connected into and then disconnected from the system with significantly less difficulty than in conventional techniques.

System Configuration

FIG. 2 is a simplified block diagram of the construction of video signal management system 10 according to a representative embodiment of the present invention. As shown in FIG. 2, system 10 includes a central processing unit (CPU) 52, read-only memory (ROM) 54, random access memory (RAM) 56, network interface card 58, input/output (I/O) circuitry 55, computer monitor port 35, remote control port 36, mouse port 37 keyboard port 38, mass storage unit 53, input/output channel cards 49, and a real-time clock 47.

CPU 52 is coupled to ROM 54, RAM 56, I/O channel cards 49, mass storage device 53, network interface card 58, and I/O circuitry 55 by a data bus 42, control bus 44, and address bus 46. ROM 54 contains certain computer-executable instructions, such as startup and operational commands for video signal management system 10. In addition, system 10 downloads various other computer-executable instructions (such as an operating system and control programs) from storage device 53 into RAM 56 for execution out of RAM 56. I/O channel cards 49 permit communication with external video signal input and video signal output devices and are discussed in more detail below. In a representative embodiment of the present invention, I/O channel cards 49 can be reprogrammed using instructions from CPU 52. Mass storage device 53 is used for nonvolatile data storage and may include a commercially available hard disk drive, nonvolatile memory such as flash memory, battery backed RAM, PC-data cards, or the like, a magnetic tape drive, or any other device for storing data on a magnetic, optical, opto-magnetic, semiconductor or other medium. Network interface card 58 permits system 10 to communicate with other devices (such as external storage device 30) via a local area network (LAN). Remote control port 36 preferably is a RS422 serial port, although port 36 may instead comprise an infrared or other transceiver for cordless communications with remote control 18. I/O circuitry 55 is connected to monitor port 35, remote control port 36, mouse port 37 and keyboard port 38.

In alternative embodiments, system 10 may include multiple processors, as well as additional input/output devices, such as a display screen, pointing device (e.g., mouse or trackball) a keyboard, microphone and/or speakers.

It should be understood that the present invention also relates to machine-readable media on which are stored program instructions for performing the methods of this invention. Such media include, by way of example, magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

Figure 3:
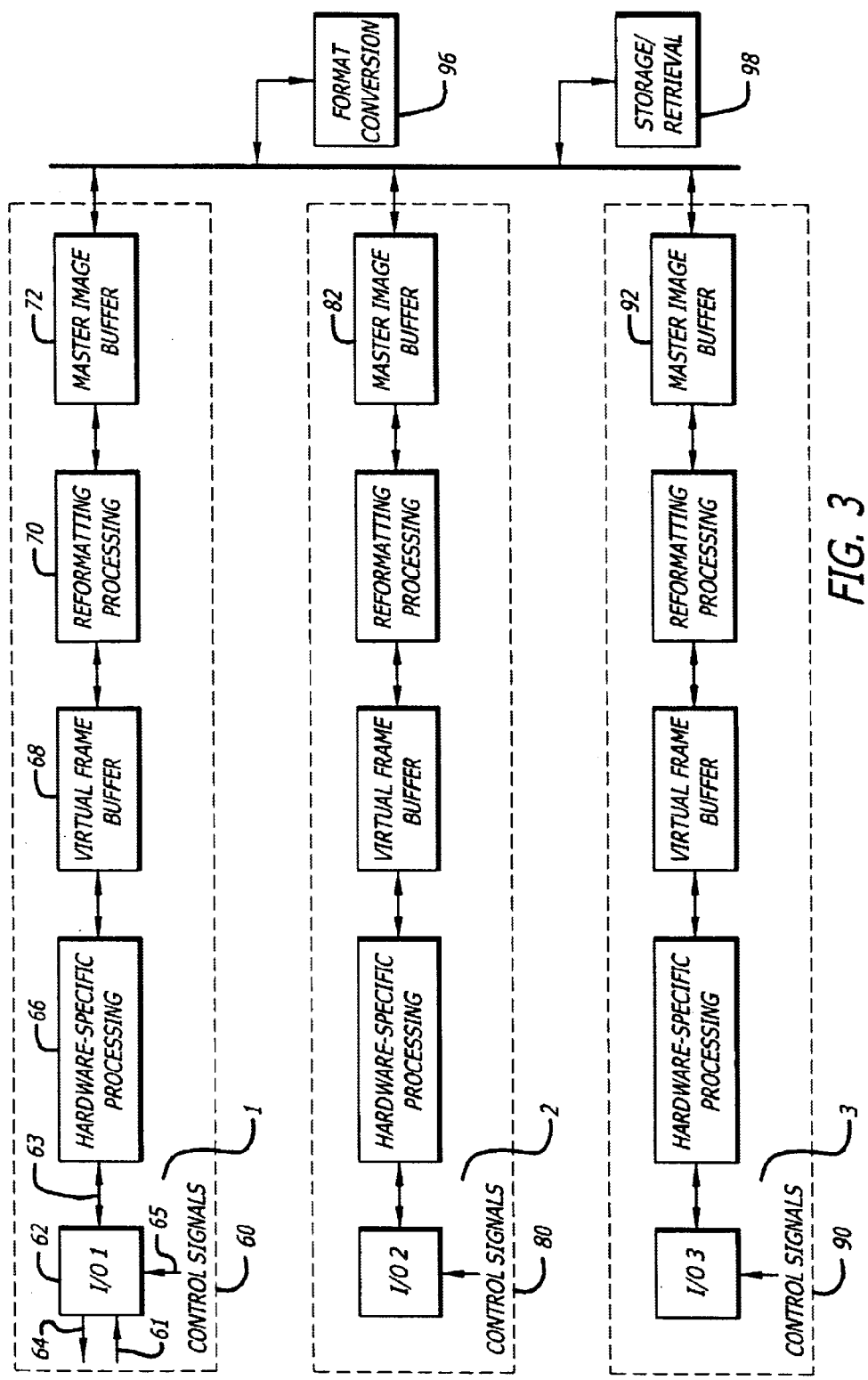
FIG. 3 is a functional block diagram illustrating the processing of input and output video signals according to a representative embodiment of the present invention.

FIG. 3 illustrates a functional block diagram of video signal management system 10 according to a representative embodiment of the invention. Each of main blocks 60, 80 and 90 in FIG. 3 represents a different channel 1, 2 and 3, respectively. The various components of each channel are described with reference to channel 1, although ordinarily the blocks for each channel will be identical.

In channel 1, video signals are input and output via an I/O module 62. In the preferred embodiment of the invention, module 62 is disposed on a printed circuit board (PCB), with a single such PCB including one or more modules 62 corresponding to one or more channels. Module 62 is described in more detail below, in connection with the discussion pertaining to FIG. 4. However, from a functional point of view, module 62: (i) inputs a digital video signal from an external source at line 61; (ii) stores image data corresponding to such input signal in an internal buffer when so instructed by control signals 65; (iii) when appropriate, inputs image data into its internal buffer provided by the remainder of system 10 via line 63; and (iv) outputs a video signal via line 64 which at any given time, based on control signals 65, may be identical to the signal input via line 61, a signal generated based on the data input via line 63 or any combination of these two. The foregoing internal buffer is shown as buffer 120 in FIG. 4. As noted above, module 62 preferably is implemented mainly in hardware, but in fact may be implemented as any combination of dedicated hardware and software. Also, module 62 may be configured to accommodate HD video signals or else may be configured to accommodate only SD video signals. Although it is possible to construct a module 62 that accommodates both, due to the different data speeds involved, such a configuration is not believed to be cost effective at the present time.

We begin by analyzing the case where a user has requested that system 10 grab the current frame of the video signal input on line 61. In this situation, the control signals 65 instruct, and module 62 then performs the task of, capturing the next whole frame input at line 61 and storing that frame in the internal buffer of module 62 (i.e., buffer 120 shown in FIG. 4).

The data stored in this internal buffer includes all the lines of image data (active and inactive) for the frame. Depending upon the input video format and how module 62 is configured, the data may be stored in the internal buffer of module 62 either as progressive lines or as one full field followed by the next full field. With respect to interlaced input video signals, system 10 may be configured (either in hardware or software) to retain both fields, to remove one field and synthesize data for it based on the remaining field (e.g., by copying the remaining field and performing vertical filtering), or to alternate between these two modes based on factors such as the amount of motion in the video signal. In addition to the particular video format, it is common for the data format to vary somewhat among individual hardware models. Thus, the formatting of the data stored in module 62's internal buffer typically includes elements of both a standard video format and a hardware-specific format.

In block 66, the hardware-specific formatting is removed, resulting in a single format for a given video format. Thus, block 66 functions as a hardware abstraction layer. Preferably, this step is performed by CPU 52 executing instructions stored in RAM 56 and/or ROM 54 and involves selecting and executing a processing module corresponding to the specific hardware element connected to the input line 61. Such processing is straightforward and can be easily performed for any hardware unit for which a processing module has been created (i.e., any supported hardware unit). Moreover, additional processing modules can be easily added to support other types of hardware. The library of modules preferably is made available for use in each channel of system 10.

Preferably, included in this processing is the removal of the inactive pixel data and the reordering of the lines of image data so that a progressive image results (although either of such steps may instead be performed in block 70). Upon completion of this processing, the image data are stored in virtual frame buffer 68, which typically will reside in RAM 56.

In block 70, the data are read from virtual frame buffer 68 and reformatted into a standardized representation. For example, it is common for the provided data to be "packed" which typically means that standard size words represent more than one value (e.g., three 10-bit values stored in one 32-bit or two 16-bit words). Thus, in the preferred embodiment the data are unpacked in this step so that each data value (typically, one luminance value and two color difference values) for each pixel is stored in a separate 16-bit register. In addition, in the event that the data have been subsampled, the color difference data are repeated as appropriate so that three data values (representing complete luminescence and color information) are stored for each pixel. The resulting bitmap image is stored in master image buffer 72 (which typically will reside in RAM 56). Preferably, the processing in step 70 is performed by CPU 52 executing computer-executable process steps stored in RAM 56 and/or ROM 54. However, portions of such processing may also be performed by dedicated hardware.

It is noted that although certain reformatting has occurred to provide a standardized bitmap representation, the data stored in buffer 72 are in the same video format as the input video signal at line 61. That is, the image aspect ratio, the pixel aspect ratio, the color space and the number of quantization levels all remain the same.

Once an image has been stored in master image buffer 72, that image data can be processed in reverse order to reverse the formatting changes discussed above for output onto line 64. Thus, in block 70 the data are re-subsampled and re-packed, as appropriate. In block 66, any hardware-specific formatting is applied, which may or may not be an exact reversal of the processing that occurred during the forward pass, depending upon whether the output device connected to the current channel uses the same hardware-specific formatting as the input device. Thereafter, the data are delivered to the internal buffer of module 62 for direct outputting or for first combining with the video signal input on line 61 and then outputting.

Several other processes also can occur with respect to a frame of image data written into master image buffer 72. For instance, upon user designation, such frame can be processed by format conversion block 96 and then copied into the master image buffer for a different channel, such as master image buffer 82 or 92. In one example, the user may designate that all frames captured on channel 11 (i.e., from the video signal input on line 61) shall be displayed on channel 12. In this case, each time a frame is captured on channel 11 and written into master image buffer 72, format conversion module 96 is instantiated.

Preferably, the processing in format conversion module 96 is performed by CPU 52 executing computer-executable process steps stored in RAM 56 and/or ROM 54. Initially, format conversion module 96 determines whether the video formats for channel 1 and channel 2 are the same. If so, then the frame stored in master image buffer 72 is simply copied into master image buffer 82 and the processing in module 96 is completed. On the other hand, if the two formats are different, format conversion module 96 first converts the format of the frame stored in buffer 72 to the format designated for channel 2 and then writes the format-converted image into buffer 82. Such format conversion is described in more detail below in connection with FIG. 5. In either event, once the frame has been written into buffer 82 in the correct format for channel 2, that frame can be output via channel 2's output in the same manner described above. In the foregoing manner, a frame captured from a video signal input on any given channel generally can be displayed at the output of any other channel of system 10.

In addition, a frame in master image buffer 72 can be stored by instantiating storage/retrieval module 98. Preferably, storage retrieval module 98 first re-packs the data and eliminates any repeated data inserted in block 70 as appropriate, returning the data to its original subsampled form. In addition any other lossless or lossy compression may be performed, although preferably any such additional compression is lossless. It is also preferred that storage/retrieval module 98 creates and stores in association with the image data a thumbnail representation of the image. Preferably, this is accomplished by a simple decimation operation (e.g., retaining only every Nth pixel in each dimension, where N is an integer such as 4 to 16, and discarding all others), although more complicated filtering operations may instead be used, such as those described below in connection with the format conversion operation. Upon completion of the foregoing processing, storage/retrieval module 98 causes the frame, together with applicable formatting information and the thumbnail image, to be stored on a storage medium such as a hard disk, removable disk, or any other magnetic, optical, opto-magnetic or semi-conductor storage medium, either internal or external to system 10.

Similarly, images may be retrieved by storage/retrieval module 98 from such storage medium and made available on any desired channel. Initially, the frame image data for a desired frame preferably are unpacked and data values repeated (as necessary). Then, format conversion module 96 is instantiated, which performs any necessary video format conversion, and the resulting frame subsequently is stored in the master image buffer for the requested channel.

In addition, module 98 preferably also includes functionality for retrieving thumbnail images from plural stored frames, instantiating format conversion module 96 to convert all such thumbnail images to the required video format, combining the converted thumbnails into a composite image, and writing the composite image into the master image buffer for the requested channel. As a result, the user can simultaneously view from any output display device thumbnail images of plural stored frames for purposes of selecting a single frame to view.

System 10 thus provides multiple channels, any or all of which may be operating in different video formats, but each of which may be able to display, and otherwise have access to, in its own video format, video data input by the others or previously stored by the others. In addition, by virtue of the foregoing arrangement, the video format for each channel can be selected arbitrarily (possibly subject to hardware speed constraints that allow certain channels to be used for high definition and others to be used only for standard definition), thereby allowing different types of hardware to be connected and disconnected from the system with relative ease.

The video format (and/or any hardware-specific format) for each channel may be designated by the user or may be automatically detected by system 10. In the latter case, for each port of each channel, in the preferred embodiment of the invention: system 10 initially checks to determine whether the same device previously connected to such port still is connected to it, by checking whether communications from the connected device match those expected from the previous device; if they do not match, system 10 attempts to communicate with the currently connected device by sequentially launching drivers associated with a particular device and attempting to communicate with the currently connected device using that driver and testing the return communications against expected communications until a match is found (or testing all available drivers and finding all potential matches, then either returning the entire list to the user or performing further testing to narrow down the list). In certain cases, identifying the hardware model in this manner will also uniquely identify the video format for the channel because the identified hardware model only operates in one video format. In other cases, the hardware database in system 10 will indicate that the device is capable of operating in different video formats and, accordingly, system 10 will prompt the user to select the video format in which the device will in fact be operating.

In the case of an I/O device that supports multiple signal formats, the hardware provided in I/O module 62 may provide assistance in determining which of the possible valid input signals are presented at the input. For example, such hardware may be configured to detect the repetition rate of frame start signals, and/or to measure the number of samples between special codes representing start and end of active video and start and end of field or frame.

FIG. 4 illustrates a simplified block diagram of I/O module 62 according to a representative embodiment of the invention. As shown in FIG. 4, module 62 includes an input terminal 102 for inputting a serial digital image signal and an output terminal 114 for outputting a serial digital image signal.

Connected to input terminal 102 is a clock signal extractor circuit 104 for separating the clock signal from the image data in an input digital video signal. Preferably, clock signal extractor circuit 104 is implemented using dedicated logic on a single integrated circuit (IC) chip. Under control of the extracted clock signal, the serial input image data are converted into parallel data in serial-to-parallel converter 106.

Module 108 provides routing, combination and processing functions for the currently input video signal and the frame of image data provided by the remainder of system 10, such as a captured frame, a frame retrieved from storage or a frame captured on another channel that was converted (if necessary) and then written into the master image buffer 72 for the current channel, as described above. All of such operations are specified by the control signals 65.

For example, in the event that the control signals 65 specify outputting the live video input at terminal 102 to output terminal 114, module 108 simply latches the data received from serial-to-parallel converter 106 to parallel-to-serial converter 110.

In the event that the control signals 65 specify a grab (or frame capture) operation, module 108 identifies the beginning of the next full frame of video data output from serial-to-parallel converter 106 using the embedded synchronization signals and then writes such output image data into I/O buffer 120 until the frame is completed. It is noted that this operation can occur at the same time that module 108 is routing live video input at terminal 102 to output terminal 114, as described above. However, in certain cases, as soon as the frame has been captured the control signals 65 will switch to indicate that the captured frame should be provided to output 114, in which case the operation described in the following paragraph will occur.

In the event that the control signals 65 specify that a frame in master image buffer 72 (which in turn may have been captured from the input of the current channel, retrieved from storage or transferred from another master image buffer, all as described in detail above), then such frame will have already been format-processed and stored in I/O buffer 120, as described above. Accordingly, module 108 repetitively reads the frame from 120 and routes the data to parallel-to-serial converter 110 for output to terminal 114 via clock signal insertion module 112.

In the preceding operations, the video signal output at terminal 114 originated at input 102 or was retrieved from buffer 120. However, module 108 can also be provided with functionality for producing output video signals that represent a composite of such video signal sources. For instance, control signals 65 might instruct a dissolve (e.g., where two images are overlaid and the two transparency values are reciprocally varied to transition from one to the other or where pseudo-randomly selected pixels change from one image source to the other until all pixels have changed during a time period, such as a couple of seconds) or a wipe (e.g., where pixels change in a wipe fashion, such as top-to-bottom, left-to-right or any combination of shapes and/or curves, from one source to the other) from the live video provided by serial-to-parallel converter 106 to the still frame stored in buffer 120 or vice versa. In either case, upon completion of any such transitional operation, only the video data from the second source will be provided to output 114 until control signals 65 indicate otherwise. Alternatively, control signals 65 might specify that the captured still frame be superimposed over the live video with a specified transparency value. In other embodiments, through appropriate resizing (as described below), I/O buffer 120 may have been loaded with a still frame that is smaller than the full output image size and control signals 65 may instruct superimposing the smaller still frame at a specified location over the live video (i.e., as a still frame inset, with or without a transparency value) and outputting the combined video signal. Such operations are well known in the art and accordingly are not discussed in detail here. Similarly, module 108 may implement other any operations for combining two video signals that are known in the art.

In order to accommodate the processing speeds required for such operations, module 108 preferably is implemented primarily or entirely in dedicated logic (e.g., using programmable gate arrays, application-specific integrated circuits or custom integrated circuits). However, it is also possible to instead use a very high speed general-purpose processor or plural general-purpose processors operating in parallel, particularly if a large number of different image combination operations are to be made available or if it is desired that the user will have wide latitude in defining new image combination or transitional operations.

FIG. 5 illustrates a flow diagram for explaining video image format conversion performed by format conversion module 96. Initially, in step 140 the following parameters are detected: input and output formats, the desired type of filtering and the desired image fit. The input image format typically will be stored in association with the source image (e.g., in buffer 72 or storage device 130), while the output image format will be the format selected for the destination channel. The types of filtering (or no filtering) available are discussed in more detail below, and the specific type of filtering to be used (or no filtering) preferably is chosen by the user of the system via one of the system user interfaces. The desired image fit comes into play when the aspect ratios of the input and output video image formats are different; the available options for this parameter are described in more detail below, with the specific option to be used preferably also chosen by the user of the system via one of the system user interfaces. In addition, in certain embodiments of the invention the user may be permitted to override the default size for the output video format and custom-select a size (e.g., x pixels by y pixels or a specified fraction of the default image size), such as where the output image is intended to be superimposed as a small inset picture on a live input video.

Figure 6A:
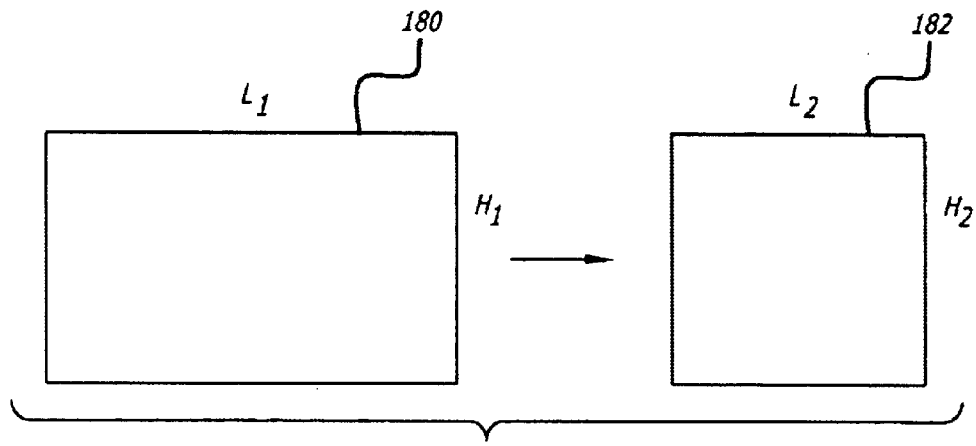
FIGS. 6A through 6C illustrate examples of fitting an input image to an output display.
Figure 6B:
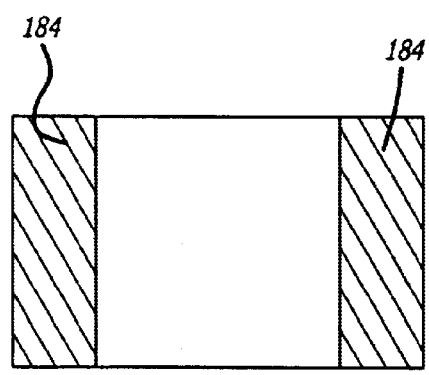
Figure 6C:
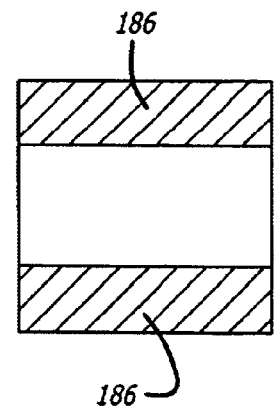

In step 142, a pattern is generated for scanning the input bitmap image. Referring to FIGS. 6A to 6C, consider a situation where the input image 180 has an aspect ratio of $L_1:H_1$ and the output image 182 is required to have an aspect ratio of $L_2:H_2$ (where $L_2$ and $H_2$ may be the standard aspect ratio for the destination video format or may custom-selected by the user, as described above). The image aspect ratio, as used in this example, is intended to mean the image aspect ratio in pixels (e.g., 1920 by 1080 or 720 by 483) adjusted for the pixel aspect ratio (e.g., 1:1 or 10:9).

In this case, image 180 can be fit to a display for image 182 in several different ways. For instance, as shown in FIG. 6B, scaling image 180 by H2/H1 results in the entire height of image 180 being displayed in the output, although the left and right edges 184 of image 180 are truncated. Alternatively, as shown in FIG. 6C, by scaling image 180 by L2/L1, all of image 180 fits in the output display, although portions 186 of the output display are then unused (typically displayed as black bands). Generally, whenever the image aspect ratios for the input and output images are different, using the same constant scaling faster for both dimensions (constant scaling) will require a selection between truncation and unused output display bands. To avoid this selection, a fit may be made by linearly scaling the input image using a different scaling factor in each dimension (i.e., a squeeze fit); however, such a fit often results in image distortion. In an attempt to lessen the obviousness of such distortion, various non-linear scaling techniques may be employed, such as utilizing constant scaling in both dimensions toward the center of the image and differential scaling near the edges of the image. Preferably, the user has been presented with various fit options and has selected one to be utilized.

Once the fit has been established in this manner, the center of each pixel in the output image display can be mapped to the appropriate location on the input image in a straightforward manner. Because pixel aspect ratio is taken into account, the shapes of objects in the image are preserved. Such mapping then defines the scan pattern to be used in the conversion.

Returning to FIG. 5, in step 144 the process is initialized to the first line of the output image. Similarly, in step 146, the process is initialized to the first pixel in the current line of the output image.

In step 148, a value is calculated for the current output pixel under consideration, preferably by utilizing the output pixel center location as mapped onto the source image together with the center locations and pixel values for one or more closest source image pixels. This value can be determined in a number of different ways. For example, the pixel value can be set to the value of the pixel in the input image nearest to the center of the pixel in the output image ("no filtering"). Alternatively, this nearest pixel may be used as the center of a kernel (e.g., a 3×3 pixel block) in the input image, and the pixel value can be set to either the average pixel value in the kernel ("average filtering") or the median pixel value in the kernel ("median filtering"). Such median and average filtering preferably are performed for each element of the pixel's value separately (e.g., luminance and two color difference values), although for median filtering it may be more appropriate to perform such filtering for the pixel value as a whole, in order to avoid introducing new colors. It is noted that even more sophisticated techniques also may be used to determine a pixel value. For instance, a kernel can be defined in the foregoing manner and a value for the pixel determined based on a two-dimensional interpolation over values in the kernel. Still further, such a two-dimensional interpolation can be weighted in each dimension based on the relative pixel aspect ratios of the input and the output video formats.

Preferably, the specific technique utilized in each case will depend on both the type of conversion being performed and a preference selected by the user. In the preferred embodiment, the user is given the option of selecting no filtering, average filtering or median filtering, and the user's selection is utilized, except in the case of an up-conversion (SD to HD), in which case no filtering is applied although values for the output pixels may be determined by interpolating over the source pixels.

Also in the preferred embodiment, black pixels are produced as need to fill areas that would not get active pixels in the destination image (e.g., to create the black bands described above). Similarly, black pixels preferably also are "assumed" at the edges of the source image where the filter kernel must move over the edge of the image.

In step 150, the number of quantization levels is adjusted between the input and output video formats. In this regard, most video formats represent values in either 8 bits or 10 bits, with the input image having each value stored in a 16-bit register. Thus, in the event of an 8-bit to 10-bit conversion, the input values for each pixel can be simply shifted left two bits and the resulting two new least significant bits filled either with zeroes or a pseudo-random 2-bit number. In the event of a 10-bit to 8-bit conversion, each input value can be rounded to nearest multiple of 100 binary and then right-shifted two bit positions. Such adjustment preferably is performed for each element of the pixel's luminance and color values.

In step 152, a determination is made as to whether the current pixel is the last pixel in the current row. If not, the next pixel in the row is selected in step 154 and processing returns to step 148 to process that pixel. If so, processing proceeds to step 156.

In step 156, color space conversion is performed, if necessary, between the input and output video formats. Preferably, this step is performed by multiplying the a vector containing the input luminance and color difference values by a color conversion matrix, as is well known in the art. Specifically, this step is repeated for each pixel in the current row of pixels. It is noted that this step may instead be performed for a single pixel prior to step 152.

In step 158, any post-conversion filtering is applied. Ordinarily, such filtering will only be applied in the event of an up-conversion (SD to HD) in order to blur any resulting blockiness. Any two-dimensional low-pass spatial filtering may be employed for these purposes, such as averaging over a square window (e.g., 3×3 pixels) centered on the current pixel. Because such filtering operations generally are performed using a group of pixels centered on the subject pixel, this step typically will lag approximately one to three pixel lines behind the other processing described above. Thus, no processing will occur in this step during the first few line iterations.

In step 160, a determination is made as to whether the current line is the last line in the output image. If not, the next line is selected in step 162 and processing returns to step 146 to process that line. If so, processing proceeds to step 164.

In step 164, any post-conversion filter processing is completed. As noted above, the processing in step 158 lags behind the other pixel line processing. Accordingly, if post-conversion filter processing is being used the last few pixel lines will be processed in this step.

User Interface

Figure 7:
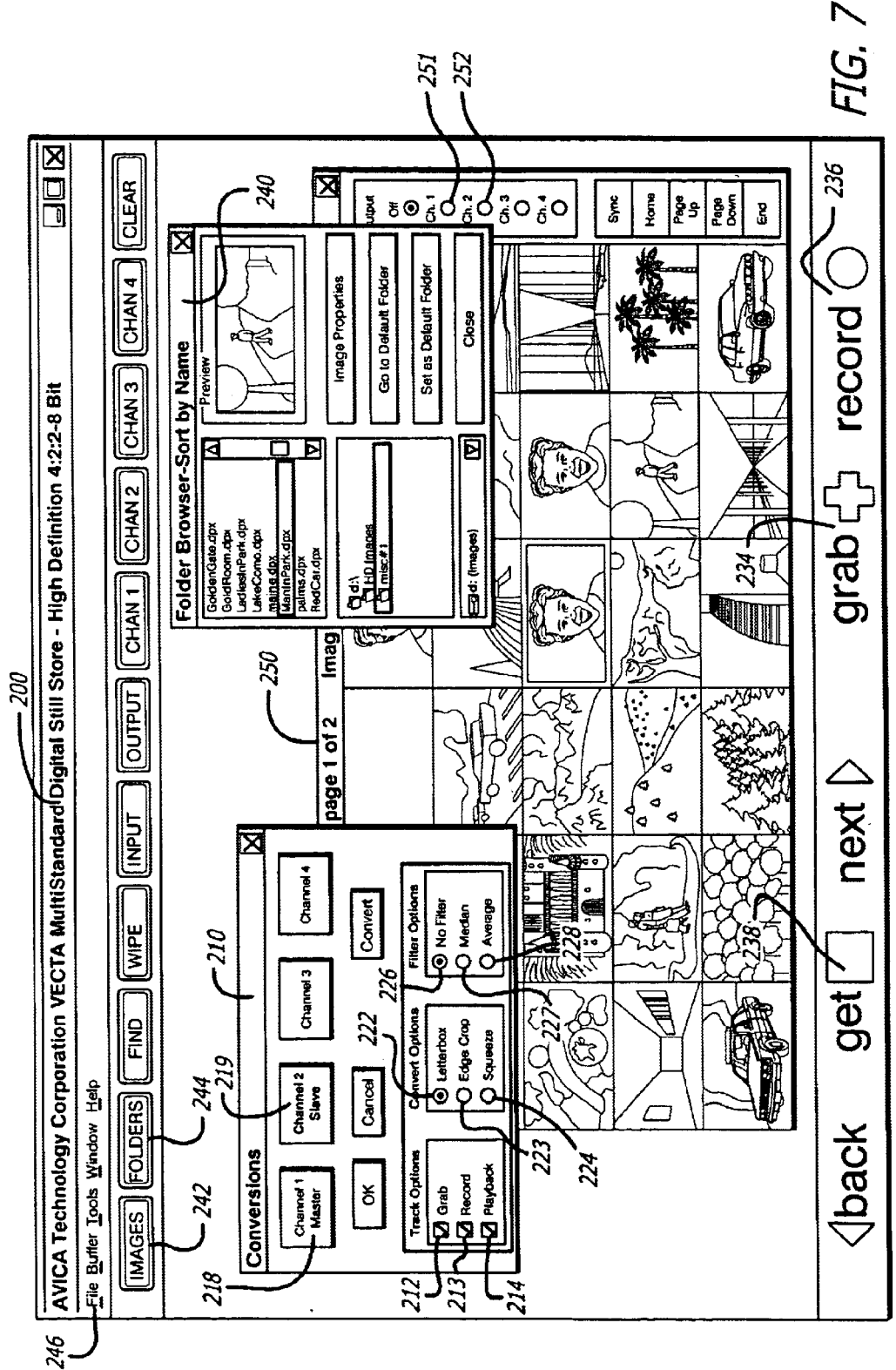
FIG. 7 illustrates a user interface for a video signal management system according to a representative embodiment of the present invention.

FIG. 7 illustrates an exemplary user interface 200 that may be provided via computer monitor 28. It is noted that some or all of the elements of such user interface may be provided for display on any of the other output devices of system 10, after performing the appropriate format conversions as described above. As shown in FIG. 7, user interface 200 includes multiple Windows for viewing and defining the settings of video signal management system 10. In the embodiment shown in FIG. 7, system 10 only includes two channels. In this case, using Conversions window 210, a user may designate one of the channels as the "master" and the other as "slave". As shown in FIG. 7, channel 1 is currently designated as the master and channel 2 is designated as the slave. However, either of these designations can be changed by clicking on the corresponding buttons 218 and 219. Because channel 2 is currently designated as the slave, channel 2's output will track what is output on channel 1 in the various selected track options 212 to 214. In particular, if "grab" option 212 is selected, then channel 2's output will display any frames grabbed (or captured) from the live video signal provided to channel 1's input. If "record" option 213 is selected, then channel 2's output will display any frames that have been recorded (or stored) after having been captured from the live video signal at channel 1's input. If "playback" option 214 is selected, then channel 2's output will display any frames that the user has requested to be retrieved from storage and displayed at channel 1's output. As all three options have been selected in FIG. 7, channel 2's output will track channel 1 in all three cases.

As such tracking typically will involve a format conversion, the user is permitted to select one of the image fit options 222 to 224 to be used in connection with such video format conversion. Specifically, "letter box" option 222 causes the horizontal dimension of the input image to fit the horizontal display for the output image (e.g., see FIG. 6C); alternatively, "edge crop" option 223 results in a constant scaling so that the images fit vertically (e.g., see FIG. 6B); and "squeeze" option 224 causes the input image to be scaled using different scaling factors in each dimension to fit the output image display (which may result in image distortion). Preferably, buttons 222 to 224 are configured as radio buttons, meaning that only one can be selected at any given time.

In addition, the user is provided with the option of using no filtering 226, median filtering 227 or average filtering 228. Each of these filtering techniques is described above. Buttons 226 to 228 preferably also are configured as radio buttons, meaning that only one can be selected at any given time.

In addition to the foregoing functionality, clicking button 234 instructs system 10 to capture the next frame of the live video input into the master channel (i.e., channel 1 in this example). Once that frame has been captured (and is stored in the master image buffer for the channel) the user may click button 236 causing that frame to be "recorded", i.e., stored in mass storage device 53. Preferably, if the user clicks button 236 after the image in master image buffer 72 has already been recorded, then system 10 grabs the next frame of the live input video signal and immediately records that frame, allowing the user to grab and record a frame in a single action.

Upon clicking on button 244 a file browser window 240 is displayed, allowing the user to browse through the stored files containing image frames. Upon selecting a frame (such as double-clicking), that frame is immediately retrieved, format converted if necessary, and written into the master image buffer for the master channel. Thereafter, the frame is processed as discussed above. In particular, in the present example, the frame typically will be output on both the master and slave channel outputs.

Upon clicking on button 242, user interface 200 displays a frame browser 250. Specifically, frame browser 250 displays an array of thumbnail images corresponding to stored frames. Selecting one of those frames (e.g., pointing to and clicking on the corresponding thumbnail image) and then clicking button 238 causes the frame to be retrieved, format converted if necessary, and written into the designated master image buffer. Specifically, the retrieved frame is written into the master image buffer for the channel indicated by radio button 251 or 252.

Additional user interface controls are also available via tool bar 246 for selecting video formats, importing and exporting image files, changing folders, setting various user options, further specifying the output video signals, and providing the other user-specified and user-designated information described herein.

It is noted that in order to display the array of thumbnail images as discussed above, format conversion module 96 may be instantiated by storage/retrieval module 98 in order to convert the retrieved thumbnail images, as necessary, to a RGB bitmap format that is appropriate for display on a computer monitor. After assembling such bitmap images into a single composite image, microprocessor 52 causes such composite image to be transmitted to computer monitor 28 via I/O circuitry 55. It is noted that the format conversion in this case generally will be similar to format conversion from one video standard to another, once the pixel size for each output thumbnail image has been determined. In particular, the color space conversion generally also will be performed using matrix multiplication, although a different matrix will be used in this case, as will be understood by those skilled in the art. Thus, in the preferred embodiment of the invention, the array of thumbnail images, and the image browser generally, can be provided to any or all of VGA monitor 28 and any video output device connected to system 10, with each such thumbnail image being format-converted as necessary.

Remote control 18 preferably is a small self-contained unit that includes as many as possible of the buttons and other controls described above. At a minimum, remote control 18 preferably includes buttons for turning the image browser on and off, toggling between live video and captured frames to be output on a given channel, grabbing a frame, recording a frame, and retrieving a frame. In addition, remote control 18 preferably includes a track ball or other pointing device for manipulating a cursor on a video output device, such as to select a thumbnail image from an array of thumbnail images. Remote control 18 preferably also includes a button for retrieving a frame corresponding to a selected thumbnail image and a small liquid crystal display (LCD) or other display for allowing the user to view the messages generated by system 10.

Conclusion

The present invention therefore allows a user to specify a different video format for each channel of a video signal management system in a very simple manner. Accordingly, different input and output devices utilizing different video formats can be easily connected and disconnected from the system. Moreover, a system of the present invention generally can permit the user to work with such differently formatted video signals largely without regard to how those signals are in fact formatted.

Although the preferred embodiment of the present invention captures, stores, retrieves and converts single frames of a video signal for use on other channels in other formats, it should be understood that the invention is not necessarily limited to such processing performed on single frames. Rather, it is possible to apply the techniques of the present invention in processing full motion video signals. Specifically, such an extension would involve capturing, storing, retrieving and/or converting sequences of consecutive frames. A single current processor is probably not fast enough to capture and convert each frame of a typical input video signal in real-time. However, it would be possible: to capture and convert frames at a slower frame rate than the input video signal in real-time using a single current processor, to capture and convert all frames in a given time interval using a single current processor but not in real-time, or to capture and convert all frames from an input video signal in real-time using multiple parallel processors functioning in parallel. In this latter case, the frames from the input video signal can be written to a bank of frame buffers, each buffer being operated on by a different processor, with the buffers being written to and read from in a cyclical manner so as to provide a real-time full motion live video signal. In addition, as processors become faster, it may be possible to perform real-time capture and conversion for all frames from an input video signal using a single processor. Storage and retrieval of video signal segments of course are well known in the art, and in the foregoing live video signal processing embodiments such techniques would be used in place of the still frame storage and retrieval described above. In such further embodiments, all of the advantages described above for still frame processing could also be obtained for live video processing.

Thus, although the present invention has been described in detail with regard to the exemplary embodiments and drawings thereof, it should be apparent to those skilled in the art that various adaptations and modifications of the present invention may be accomplished without departing from the spirit and the scope of the invention. Accordingly, the invention is not limited to the precise embodiments shown in the drawings and described in detail above. Rather, it is intended that all such variations not departing from the spirit of the invention be considered as within the scope thereof as limited solely by the claims appended hereto.

Also, several different embodiments of the present invention are described above, with each such embodiment described as including certain features. However, it is intended that the features described in connection with the discussion of any single embodiment are not limited to that embodiment, but may be included and/or arranged in various combinations in any of the other embodiments as well, as will be understood by those skilled in the art.

What is claimed is:

1. An apparatus for managing video signals in different video formats, said apparatus comprising:

plural channel means for inputting and outputting video signals, each said channel means having an associated video format;

user interface means for inputting a user designation that an output of a user-designated first channel means should provide an output video signal corresponding to an input video signal input via a user-designated second channel means;

conversion means for automatically converting the input video signal to the video format associated with the user-designated first channel means so as to obtain the output video signal; and output means for outputting the output video signal via the output of the user-designated first channel means.

2. An apparatus according to claim 1, wherein each channel means includes an input and an output.

3. An apparatus according to claim 2, further comprising storing means for storing the input video signal into a storage means that is capable of storing a plurality of similar types of video signals.

4. An apparatus according to claim 3, wherein the output for a selected channel means can be set, via said user interface means, to output either: a video signal input into said selected channel means, a video signal input into a different channel means, or a video signal previously stored by said storing means, and wherein in each case said conversion means performs any necessary format conversion to insure that the video signal output via said selected channel means is in the video format associated with said selected channel means.

5. An apparatus according to claim 1, wherein each of said plural channel means includes formatting means for processing the input video signal to obtain an unpacked non-subsampled bitmap image.

6. An apparatus according to claim 5, wherein said conversion means processes the unpacked non-subsampled bitmap image corresponding to the input video signal to create a second unpacked non-subsampled bitmap image in the video format associated with the user-designated first channel means.

7. An apparatus for managing video signals in different video formats, said apparatus comprising:

plural channel means for inputting and outputting video signals;

user interface means for inputting a user selection of a video format for each of said channel means and for inputting a user designation that an output of a user-designated first channel means should provide an output video signal corresponding to an input video signal input via a user-designated second channel means;

conversion means for automatically converting the input video signal to the video format selected for the user-designated first channel means so as to obtain the output video signal; and output means for outputting the output video signal via the output of the user-designated first channel means.

8. An apparatus according to claim 7, wherein a user is permitted to select from a set of pre-defined high definition video formats for each channel means designed to accommodate high definition video signals and is permitted to select from a set of pre-defined standard definition video formats for each channel means designed to accommodate standard definition video signals.

9. An apparatus according to claim 7, wherein each channel means includes an input and an output.

10. An apparatus according to claim 9, further comprising storing means for storing the input video signal into a storage means that is capable of storing a plurality of similar types of video signals.

11. An apparatus according to claim 10, further comprising capture means for capturing a single frame of a video signal input via one of said channel means, wherein the output for a selected channel means can be set, via said user interface means, to output either: a live video signal input into said selected channel means, a single frame captured from the live video signal input into said selected channel means, a single frame captured from a live video signal input into a different channel means, or a single frame previously stored by said storing means, and wherein in each case said conversion means performs any necessary format conversion to insure that the video signal output to said selected channel means is in the video format previously selected for said selected channel means.

12. An apparatus according to claim 11, wherein the output for the selected channel means can be set, via said user interface means, to output a composite video signal comprising a combination of at least two of: the live video signal input into said selected channel means, a single frame captured from the live video signal input into said selected channel means, a single frame captured from the live video signal input into a different channel means, or a single frame previously stored by said storing means, and wherein in each case said conversion means performs any necessary format conversion to insure that the composite video signal is in the video format previously selected for said selected channel means.

13. An apparatus according to claim 10, wherein the output for a selected channel means can be set, via said user interface means, to output either: a video signal input into said selected channel means, a video signal input into a different channel means, or a user-selected video signal previously stored by said storing means, and wherein in each case said conversion means performs any necessary format conversion to insure that the video signal output to said selected channel means is in the video format previously selected for said selected channel means.

14. An apparatus according to claim 13, wherein the output for the selected channel means can be set, via said user interface means, to output a composite video signal comprising a combination of at least two of: the video signal input into said selected channel means, the video signal input into a different channel means, or a user-selected video signal previously stored by said storing means, and wherein in each case said conversion means performs any necessary format conversion to insure that the composite video signal is in the video format previously selected for said selected channel means.

15. An apparatus according to claim 7, further comprising capture means for capturing a single frame of a video signal input into one of said channel means.

16. An apparatus according to claim 7, wherein each of said plural channel means includes hardware abstraction means for performing hardware-specific format processing on video signals.

17. An apparatus according to claim 7, wherein each of said plural channel means includes formatting means for processing the input video signal to obtain an unpacked non-subsampled bitmap image.

18. An apparatus according to claim 17, wherein said conversion means processes the unpacked non-subsampled bitmap image corresponding to the input video signal to create a second unpacked non-subsampled bitmap image in the video format selected for the user-designated first channel means.

19. An apparatus for managing video signals in different video formats, said apparatus comprising:
plural channel means for inputting and outputting video signals;
capture means for capturing a single frame of an input video signal;
user interface means for inputting a user selection of a video format for each of said channel means and for inputting a user designation that an output of a user-designated first channel means should output frames captured from a video signal input into a user-designated second channel means;
conversion means for automatically converting frames captured from the video signal input into the user-designated second channel means into the video format selected for the user-designated first channel means; and
output means for outputting said captured frames, in the video format selected for the user-designated first channel means, via the output for the user-designated first channel means.

20. An apparatus according to claim 19, further comprising storing means for storing captured frames into a storage means.

21. An apparatus according to claim 20, wherein an output for a selected channel means can be set, via said user interface means, to output either: a live video signal input into said selected channel means, a single frame captured from the live video signal input into said selected channel means, a single frame captured from a live video signal input into a different channel means, or a single frame previously stored by said storing means, and wherein in each case said conversion means performs any necessary format conversion to insure that the video signal output to the selected channel means is in the video format previously selected for said selected channel means.

22. An apparatus according to claim 19, wherein each of said plural channel means includes hardware abstraction means for performing hardware-specific format processing on video signals.

23. An apparatus according to claim 19, wherein each of said plural channel means includes formatting means for processing a captured frame to obtain an unpacked non-subsampled bitmap image.

24. An apparatus according to claim 23, wherein said conversion means processes the unpacked non-subsampled bitmap image corresponding to one of the captured frames to create a second unpacked non-subsampled bitmap image in the video format selected for the user-designated first channel means.

25. An apparatus for managing video signals in different video formats, said apparatus comprising:
plural channel means for inputting and outputting video signals;
user interface means for inputting a user selection of a video format for each of said channel means;
conversion means for automatically converting video data input via a first channel means into the video format selected for a second channel means; and
output means for outputting the video data, in the video format selected for the second channel means, via the output for the second channel means.

* * * * *

UNITED STATES PATENT AND TRADEMARK OFFICE
CERTIFICATE OF CORRECTION

PATENT NO.   : 6,791,620 B1
DATED        : September 14, 2004
INVENTOR(S)  : William E. Elswick et al.

It is certified that error appears in the above-identified patent and that said Letters Patent is hereby corrected as shown below:

Column 2,
Line 5, change "SD arid HD" to -- SD and HD --

Signed and Sealed this

Twenty-first Day of December, 2004

JON W. DUDAS
*Director of the United States Patent and Trademark Office*